April 3, 1928.

E. L. KULICK

BRACKET AND BRAKE LEVER

Filed May 9, 1927

1,664,825

INVENTOR
EDWARD L. KULICK
BY
M. W. McConkey
ATTORNEY

Patented Apr. 3, 1928.

1,664,825

UNITED STATES PATENT OFFICE.

EDWARD L. KULICK, OF MILWAUKEE, WISCONSIN, ASSIGNOR, BY MESNE ASSIGNMENTS, TO BENDIX BRAKE COMPANY, OF CHICAGO, ILLINOIS, A CORPORATION OF ILLINOIS.

BRACKET AND BRAKE LEVER.

Application filed May 9, 1927. Serial No. 198,751.

This invention relates, in a general way, to brakes, and is illustrated as embodied in novel operating means for a front-wheel automobile brake.

One feature of the invention relates to the provision of a novel supporting bracket for the brake lever, having one part engaged and held by the king-pin of the wheel, and having another part engaging and secured to one arm at the end of a forked axle to which the wheel is swivelled.

Other features relate to the arrangement of a novel horizontal lever,—i. e. one fulcrumed for movement with one end swinging crosswise of the swivelling axis and arranged in that axis when the brake is applied,—to operate a brake on a swivelled wheel through the medium of a link or equivalent friction member moved lengthwise in applying the brake; and to the operation of an external contracting brake on a swivelled wheel by means including a joint, such as the joint between the above-described lever and link, which moves crosswise of the swivelling axis in applying the brake, and which is arranged in or immediately adjacent that axis when the brake is applied.

The above and other objects and features of the invention, including various novel combinations of parts and desirable particular constructions, will be apparent from the following description of one illustrative embodiment shown in the accompanying drawing, in which.

Figure 1:
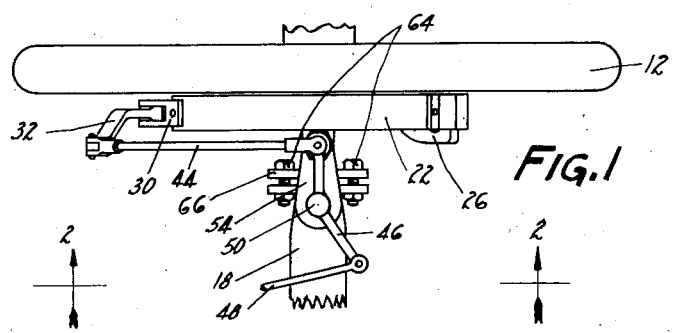
Figure 1 is a top plan view of the left front wheel and associated parts.
Figure 2:
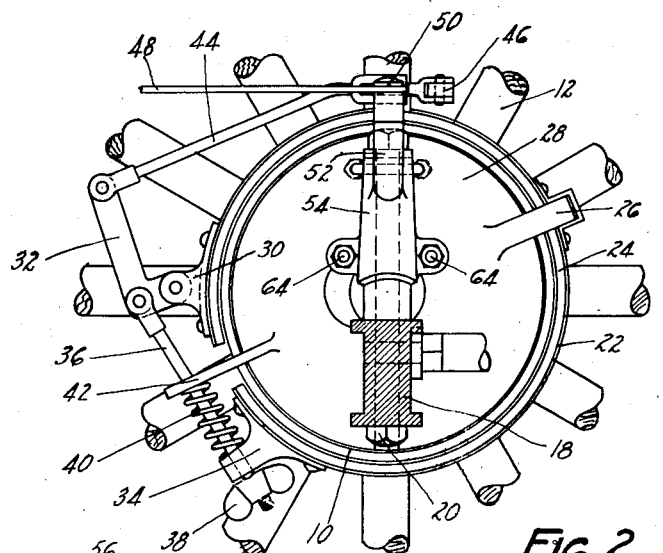
Figure 2 is a section on the line 2—2 of Figure 1, showing the parts of Figure 1 in inside elevation.
Figure 3:
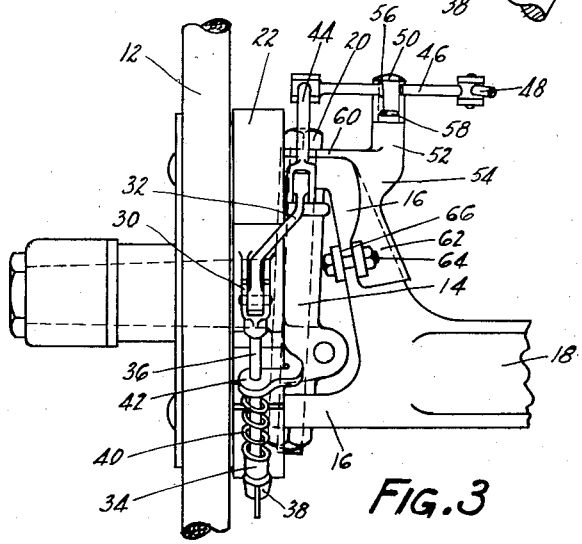
Figure 3 is a rear elevation of the parts shown in Figure 2.

The illustrated construction includes a drum 10, rotating with a wheel 12 mounted on a knuckle 14. Knuckle 14 is swivelled between arms 16, at the end of a forked axle 18, by means such as a king-pin 20.

The friction means of the brake is preferably an external contracting band 22, having suitable lining 24 on its inner side, and which surrounds the drum 10 and is anchored at the front of the drum to an arm 26 secured to or integral with a plate 28 carried by the knuckle 14. The band has at one end a fitting 30, to which is pivoted the end of a right-angle lever 32. Lever 32 is connected to a fitting 34 on the other end of the band by a link 36 pivoted to lever 32 and having its other end extending through an opening in fitting 34 and threaded to receive a wing nut 38.

A coil release spring 40 is sleeved on link 36, and is confined between fitting 34 and a bracket 42 secured to or integral with plate 28, and having an opening through which link 36 passes. The upper end of lever 32 is offset into line with the swivelling axis of the wheel, i. e. with king-pin 20.

The brake is operated by novel means such as a tension element or link 44 pivotally connected to the upper end of lever 32, and moved lengthwise in applying the brake by a device such as a horizontal lever 46, to which it is connected by a joint moving in applying the brake toward the swivelling axis in an arc substantially intersecting that axis, and which joint is arranged when the brake is applied in or immediately adjacent that axis. Lever 46 may be operated by a brake rod or other connection 48, which is thus spaced inwardly away from the swivelling axis, along the axle, by substantially the length of the lever. It will be noted that lever 46 is approximately perpendicular to the wheel, while lever 32 is approximately parallel to the wheel,—i. e. they are substantially perpendicular to each other.

According to one feature of the invention, lever 46 is fulcrumed on a pivot 50 carried by and which may be integral with a boss 52 on a novel bracket 54, there being a pin 56 secured in the pivot and extending into a slot 58 formed in the hub of the lever to hold the pivot and lever in place. Bracket 54 has one part 60 overlying the upper arm 16 of the axle and held by the king-pin 20, and another part 62 extending downwardly along the arm and clamped thereto by bolts 64 engaging a clamp plate 66 on the opposite side of the arm.

While one illustrative embodiment has been described in detail, it is not my intention to limit the scope of the invention to that particular embodiment, or otherwise than by the terms of the appended claims.

I claim:

1. A lever-supporting bracket to be mounted on an axle having a knuckle swivelled at its end by means of a king-pin, and comprising a part clamped to the axle and another part held by the king-pin.

2. A vehicle having, in combination, a swivelled wheel having a drum, an external contracting friction device surrounding the drum, and means for contracting such device against the drum including a part swivelling with the wheel and a non-swivelling part having a point of engagement movable in a plane substantially perpendicular to the swivelling axis.

3. A vehicle having, in combination, a swivelled wheel having a drum and a contractable friction device surrounding the drum, a part swivelling with the wheel and arranged to contract said device against the drum, and a non-swivelling member engaging said part, the point of engagement being movable in a plane substantially perpendicular to the swivelling axis.

4. A vehicle having, in combination, a swivelled wheel having a drum, a contractable friction device surrounding the drum, and means for contracting said device including a part swivelling with the wheel and a non-swivelling part having a point of engagement movable at right angles to the swivelling axis toward that axis in applying the brake.

5. A vehicle having, in combination, a swivelled wheel having a drum, a contractable friction device surrounding the drum, a lever arranged to contract said device against the drum, a brake-applying member having a part movable in a plane perpendicular to the swivelling axis toward that axis from and idle position spaced from said axis, and a connection between said part and said lever.

6. A vehicle having, in combination, a swivelled wheel having a drum, a contractable friction device surrounding the drum, an operating lever having a part movable in a plane perpendicular to the swivelling axis from an idle position spaced from that axis, and means operated by said part of the lever for contracting the friction device against the drum.

7. A vehicle having, in combination, a swivelled wheel having a drum and a contractable friction device surrounding the drum, a pivoted lever mounted for movement in a plane perpendicular to the swivelling axis and having one end movable in applying the brake toward that axis from an idle position spaced from the swivelling axis, and means pivotally connected to said end of the lever and operated thereby to contract said device against the drum.

8. A vehicle having, in combination, a swivelled wheel having a drum, a contractable friction device surrounding the drum, a lever arranged to contract said device against the drum, an operating lever having a part movable from a position spaced from the swivelling axis toward that axis, and a link pivotally connected to said part and to the contracting lever, the two levers being approximately perpendicular to each other.

9. A vehicle having, in combination, a swivelled wheel having a drum, a contractable friction device surrounding the drum, a lever for contracting said device having its end in idle position arranged immediately behind the swivelling axis, and an independently mounted lever operated by said end of the contracting lever, said end of the lever moving forwardly in applying the brake toward the swivelling axis and in a plane perpendicular to that axis.

10. Applying means for a brake on a wheel comprising, in combination, a lever extending approximately perpendicular to the wheel, another lever extending approximately parallel to the wheel, and a link connecting said levers and moved lengthwise in applying the brake.

11. Applying means for a brake on a swivelled wheel comprising, in combination, a lever extending approximately perpendicular to the wheel, another elever extending approximately parallel to the wheel, and a link jointed to and connecting said levers and moved lengthwise in applying the brake, the joint at one end of said link being arranged (when the brake is applied) substantially at the swivelling axis of the wheel.

12. Operating mechanism for a brake on a wheel swivelled on an axle, comprising, in combination, a lever fulcrumed on the axle for movement about an axis paralleling the swivelling axis of the wheel and extending in a general way along the axle and having its outer end arranged (when the brake is applied) substantially at the swivelling axis of the wheel, a second lever at one side of the brake, and a link connecting said levers and moved lengthwise in applying the brake.

13. Operating mechanism for a brake on a swivelled wheel comprising, in combination, a lever arranged for movement about an axis paralleling the swivelling axis of the wheel and extending in a general way inwardly away from the wheel and having its outer end arranged (when the brake is applied) substantially at the swivelling axis of the wheel, a second lever at one side of the brake, and a link connecting said levers and moved lengthwise in applying the brake.

14. Operating mechanism for a brake on a swivelled wheel comprising, in combination, a lever arranged for movement about an axis paralleling the swivelling axis of the wheel and extending in a general way inwardly away from the wheel and having its outer end arranged (when the brake is applied) substantially at the swivelling axis of the wheel, an applying device for the brake swivelling with the wheel and arranged some distance from the swivelling axis, and a link connecting the end of the lever to said device and moved lengthwise in applying the brake.

15. Operating mechanism for a brake on a swivelled wheel comprising, in combination, a lever arranged for movement about an axis paralleling the swivelling axis of the wheel and extending in a general way inwardly away from the wheel and having its outer end arranged (when the brake is applied) substantially at the swivelling axis of the wheel, an applying device for the brake swivelling with the wheel and arranged some distance behind the swivelling axis, and a tension element connecting the end of the lever to said device and moved lengthwise in applying the brake.

16. Brake-applying means comprising, in combination, a bracket having a portion to engage one arm of a forked axle and another portion to overlie said arm and to be held by the king-pin, and a lever fulcrumed on the bracket with one end movable in an arc intersecting the axis of the king-pin.

In testimony whereof, I have hereunto signed my name.

EDWARD L. KULICK.